United States Patent
Ananda (12) United States Patent    (10) Patent No.: US 6,845,293 B1
(45) Date of Patent: Jan. 18, 2005

(54) METHOD AND APPARATUS FOR TRANSPORTING PASSENGER BAGGAGE

(76) Inventor: Mohan Ananda, 549 Lakeview Canyon Rd., Westlake Village, CA (US) 91362

( * ) Notice: Subject to any disclaimer, the term of this patent is extended or adjusted under 35 U.S.C. 154(b) by 146 days.

(21) Appl. No.: 10/183,962

(22) Filed: Jun. 26, 2002

(51) Int. Cl.$^7$ ................................................. G06F 7/00
(52) U.S. Cl. ............................ 700/226; 705/5; 235/384
(58) Field of Search ................................. 700/213, 225, 700/226, 229; 705/5, 23, 100; 235/384

(56) References Cited

U.S. PATENT DOCUMENTS

| | | | | |
|---|---|---|---|---|
| 5,866,888 A | * | 2/1999 | Bravman et al. | 235/375 |
| 6,003,009 A | * | 12/1999 | Nishimura | 705/5 |
| 6,158,658 A | | 12/2000 | Barclay | |
| 6,512,964 B1 | * | 1/2003 | Quackenbush et al. | 700/226 |
| 6,594,547 B2 | * | 7/2003 | Manabe et al. | 700/227 |

OTHER PUBLICATIONS

Jennifer Oldham; "Hahn Plan Shifts LAX Burden to Other Cities", Los Angeles Times, Jul. 3, 2002, p. A1 and A20.
Jennifer Oldham; "$9.6–Billion Make–Over for LAX?", Los Angeles Times, Jul. 2, 2002, p. A1 and A17.

* cited by examiner

Primary Examiner—Khoi H. Tran
(74) Attorney, Agent, or Firm—The Hecker Law Group

(57) ABSTRACT

This invention comprises a baggage transport system for handling passenger baggage for transport. In accordance with one or more embodiments of this invention, when a passenger makes a reservation to travel, a passenger identifier number, which may be a ticket or reservation number, is issued and placed in a data collection together with the passenger's transport number, date of travel, time of travel and method of carrier compensation. When the passenger obtains a ticket to a destination, the ticket identifies the passenger identifier, the transport number and date of departure.

Rather than check baggage for carriage at the transport check-in counter, under one embodiment of this invention, baggage is checked for carriage to a destination before departure at a baggage collection facility that is separate from the departure and arrival facility. In the proposed system, passengers will obtain their ticket or passenger identifier at any time in advance of travel and leave off their baggage at a convenient baggage collection center, which may feature drive-in service. The baggage collection center will then accept the baggage for transport to the passengers' ultimate destinations, not merely to the destination transport arrival facilities, which may be airports. Passengers will be able to have their baggage delivered directly to their homes, hotels, offices or other location, rather than having to struggle with baggage at transport arrival facility baggage pickup carousels. Thus, passengers will be able to enter and leave transport arrival facilities quickly and conveniently.

35 Claims, 7 Drawing Sheets

BAGGAGE TRANSPORT DATABASE – PAGE 1

| | |
|---|---|
| RECORD NO.: | 432744058892384343283 |
| PASSENGER IDENTIFIER: | 7432490773912 |
| NAME: | John Passenger |
| DEPARTURE STREET ADDRESS: | 1000 Ocean Blvd., #2401 |
| DEPARTURE CITY: | Long Beach |
| DEPARTURE STATE: | CA |
| DEPARTURE POSTAL CODE: | 90251 |
| DEPARTURE COUNTRY: | USA |
| DEPARTURE TELEPHONE: | 310-555-1234 |
| DESTINATION CITY: | Washington-Dulles |
| DEPARTURE DATE: | 01-04-02 |
| DEPARTURE TIME | 8:45 AM: |
| TRANSPORT NO.: | UA51 |
| | |
| DESTINATION HOME/HOTEL/OFFICE: | Washingtonian Hotel |
| DESTINATION STREET ADDRESS: | 705 5$^{th}$ St. NW |
| DESTINATION CITY: | Washington |
| DESTINATION STATE: | D.C. |
| DESTINATION POSTAL CODE: | 10456 |
| DESTINATION COUNTRY: | USA |
| DESTINATION TELEPHONE: | 202-555-1245 |
| FARE: | $1567.00 |
| FARE BASIS: | Y |
| MODE OF PAYMENT: | VISA 80819484545809 |
| | |
| BAGGAGE COLLECTED (YES/NO)?: | YES |
| BAGGAGE CLAIM CHECK NO.: | 7432490773912.1 |
| | 7432490773912.2 |
| | 7432490773912.3 |
| ENTER OVERWEIGHT AMOUNT: | 105 lbs |
| ENTER OVERWEIGHT CHARGE: | $134.00 |
| ENTER EXCESS BAGGAGE AMOUNT: | 1 |
| ENTER EXCESS BAGGAGE CHARGE: | $25.00 |
| CUSTOMS DECLARATION COMPLETED: | N/A |
| CUSTOMS PAYMENTS: | N/A |
| PASSENGER CHECKED IN (YES/NO)?: | YES |
| PASSENGER ARRIVED (YES/NO)?: | YES |
| DELIVERY AUTHORIZED(YES/NO)?: | YES |
| BAGGAGE CARRIER | Washington Delivery Service |
| BAGGAGE RECEIVED/SIGNED FOR | YES |

FIG. 3

BAGGAGE TRACE DATA - PAGE 2

| CLM CHK NO. | LOCATION | DATE | TIME |
|---|---|---|---|
| 7432490773912.1 | Long Beach BCC-4732984 | 01/03/02 | 3:05PM |
| 7432490773912.2 | Long Beach BCC-4732984 | 01/03/02 | 3:05PM |
| 7432490773912.3 | Long Beach BCC-4732984 | 01/03/02 | 3:05PM |
| 7432490773912.1 | Los Angeles BConC-80N9840 | 01/03/02 | 7:21PM |
| 7432490773912.2 | Los Angeles BConC-80N9840 | 01/03/02 | 7:21PM |
| 7432490773912.3 | Los Angeles BConC-80N9840 | 01/03/02 | 7:21PM |
| 7432490773912.1 | Los Angeles Qck Bag Trns | 01/03/02 | 10:15PM |
| 7432490773912.2 | Los Angeles Qck Bag Trns | 01/03/02 | 10:15PM |
| 7432490773912.3 | Los Angeles Qck Bag Trns | 01/03/02 | 10:15PM |
| 7432490773912.1 | Washington Qck Bag Trns | 01/04/02 | 7:00AM |
| 7432490773912.2 | Washington Qck Bag Trns | 01/04/02 | 7:00AM |
| 7432490773912.3 | Washington Qck Bag Trns | 01/04/02 | 7:00AM |
| 7432490773912.1 | Washington BDC-XC438490 | 01/04/02 | 7:00AM |
| 7432490773912.2 | Washington BDC-XC438490 | 01/04/02 | 7:00AM |
| 7432490773912.3 | Washington BDC-XC438490 | 01/04/02 | 7:00AM |
| 7432490773912 | CHECK IN LOS ANGELES | 01/04/02 | 8:00AM |
| 7432490773912 | BOARDED LOS ANGELES | 01/04/02 | 8:45AM |
| 7432490773912 | ARRIVED WASHINGTON | 01/04/02 | 4:45PM |
| 7432490773912.1 | RELEASED BDC | 01/04/02 | 5:00PM |
| 7432490773912.2 | RELEASED BDC | 01/04/02 | 5:00PM |
| 7432490773912.3 | RELEASED BDC | 01/04/02 | 5:00PM |
| 7432490773912.1 | Washington Delivery Serv | 01/04/02 | 5:15PM |
| 7432490773912.2 | Washington Delivery Serv | 01/04/02 | 5:15PM |
| 7432490773912.3 | Washington Delivery Serv | 01/04/02 | 5:15PM |
| 7432490773912.1 | John Passenger Washingtonian | 01/04/02 | 7:15PM |
| 7432490773912.2 | John Passenger Washingtonian | 01/04/02 | 7:15PM |
| 7432490773912.3 | John Passenger Washingtonian | 01/04/02 | 7:15PM |

TRACE CLOSED

FIG. 4

BAGGAGE CLAIM CHECK

APPLY TO BAGGAGE
FOR CARRIER USE ONLY

| | |
|---|---|
| Claim Check No.: | 7432490773912.1 |
| Bags for this check: | 1 |
| Bag Weight: | 105 lbs. |
| | |
| Passenger Identifier: | 7432490773912 |
| Name: | John Passenger |
| Baggage Check-in: | LB-CA-BCC |
| Baggage Destination: | Wash-DC-BDC |
| Transport No.: | UA 51 |
| Transport Date: | 01-04-02 |
| Departure Time: | 8:45 AM |
| Bag Drop Off Date: | 01-03-02 |
| Drop Off Time: | 3:05 PM |

---

BAGGAGE CLAIM CHECK
PASSENGER RECEIPT

The carrier's liability for loss or damage is strictly limited by the conditions listed on the opposite side of this claim check.

| | |
|---|---|
| Claim Check No.: | 7432490773912.1 |
| Bags for this check: | 1 |
| Bag Weight: | 105 lbs. |
| | |
| Passenger Identifier: | 7432490773912 |
| Name: | John Passenger |
| Baggage Check-in: | LB-CA-BCC |
| Baggage Destination: | Wash-DC-BDC |
| Transport No.: | UA 51 |
| Transport Date: | 01-04-02 |
| Departure Time: | 8:45 AM |
| Bag Drop Off Date: | 01-03-02 |
| Drop Off Time: | 3:05 PM |

FIG. 5

METHOD AND APPARATUS FOR TRANSPORTING PASSENGER BAGGAGE

BACKGROUND OF THE INVENTION

1. Field of the Invention

This invention relates in general to travel and to handling and transporting passenger baggage and, more specifically, to the development of a system that substantially changes baggage handling procedures in order to achieve increased efficiency, security and convenience for the traveling public.

2. Background Art

Since the beginning of commercial transportation services, carriers have transported limited quantities of baggage for passengers without charge, even though the cost to the carriers was substantial. The transportation of passenger baggage represents a major operating cost for carriers and ads substantially to the price of passenger tickets. Baggage transportation is particularly expensive for air carriers.

Air travel has become the principal means of passenger travel on long trips in recent years and the volume of air travel has increased considerably due to reduced fares. This has caused substantial congestion at airports that were never designed to accommodate the number of passengers now traveling. The problem has become more acute with recent terrorist attacks that have led to the implementation of increased security measures at airport terminals. Although technology has advanced substantially in the travel industry, the current baggage handling system, in which passengers and their baggage travel together, predates air and rail travel.

Furthermore, the present system in use at airports requires an enormous amount of expensive airport space, both at the area where the passenger deposits the baggage at the airport and at the area where the passenger retrieves the baggage after the completion of travel. Valuable space on aircraft could also be used more effectively in terms of revenue generation. If baggage were carried separately from passengers, the space currently occupied by baggage in commercial aircraft could be filled with freight, generating higher revenue. Further, if the baggage area on aircraft was converted to passenger cabin space, the space could be used to accommodate additional passengers. Moreover, the number of personnel necessary to administer and manage the current baggage handling system is significant and could be reduced, cutting costs, if the current system is radically changed.

Elimination of baggage on passenger flights would reduce airport congestion, airport space requirements and would facilitate the transfer of people at connecting hubs where passengers change aircraft. For shorter flights, baggage could be transported by truck or train in advance of the need for travel and would be available soon after passenger arrival. In addition to saving space on aircraft, elimination or reduction of baggage would reduce the weight to be carried by the aircraft. Consumption of costly fuel by aircraft is directly proportional to the weight being carried. Maintenance cost would also be reduced if the aircraft, as a result of elimination of baggage, carried less weight.

One of the main causes of delayed flights is the delay in baggage handling, particularly at airline hubs where passengers transfer from plane to plane to complete their travel. Substantial time at airline hubs is required for loading and unloading baggage in order to transfer baggage from one plane to another under the present system, where baggage travels on the same plane as the passengers. With the hub and spoke system now prevalent in the airline industry, mountains of baggage are moved between dozens of planes at airline hubs located in Atlanta, Chicago, Dallas and other cities, typically within a half hour. This process is repeated every hour of every day of the year. Baggage handling delays often lead to flight delays that propagate through hub and spoke airline systems causing passengers to miss their connecting flights. Aircraft that are late to depart from the hubs cause arriving planes to be late also. Passengers can typically be transferred to different planes at hubs much faster than their baggage because the passengers can get up and move on their own, whereas baggage has to be moved by an airline baggage handler. Passengers on planes that are late arriving at hubs may be able to get on their connecting flights, only to find that their baggage was not transferred due to a lack of time at the connecting point, causing unexpected long waiting times for their baggage at their destinations. Much of the baggage "lost" during flights is due to insufficient baggage handling time at the various airline hubs for transferring the baggage from one aircraft to another for the passengers' connecting flights.

The security of the baggage is another major issue. With the need for rapid transfer of large amounts of baggage, inadequate attention is paid to searching baggage for explosives, weapons, drugs or other contraband due to a lack of time. Until recently, the baggage on domestic airline flights was rarely x-rayed, or otherwise searched, due to the shear volume of baggage and the time and cost involved. The result of not searching can be a disaster such as occurred when Pan American flight 103 exploded over Lockerby, Scotland in 1988. Drug smugglers typically rely on the inability of customs to carefully search every piece of baggage due to time constraints. Elimination of baggage transport in the same aircraft as the passengers would allow the conduct of more extensive baggage searches by customs and security and would also eliminate the threat of passengers placing bombs in their baggage to collect flight life insurance. Separating the passengers from their baggage during travel would greatly decrease the long waiting time currently experienced by passengers passing through security check points as baggage could be searched to the extent desired without impeding passengers' travel.

There is a need for a less costly alternative to the present baggage handling system, as a means of reducing passenger waiting time, reducing departure and arrival area congestion and increasing security and cost control.

SUMMARY OF THE INVENTION

This invention comprises a baggage transport system and method with a unique collection and distribution system for handling passenger baggage. More particularly, the invention separates the transport of baggage from the transport of passengers, thereby increasing the convenience of commercial transportation services to passengers by reducing waiting times for transport check-in, reducing travel area congestion, improving passenger connecting times with other transport, improving security and reducing costs.

In one embodiment of the baggage transport system, passengers deposit their baggage at convenient baggage collection centers located away from departure facilities. After the passengers arrive at their destinations, their baggage is delivered to them at a destination address provided by the passenger, thereby avoiding the need for passengers to haul baggage from their transport arrival areas. The passenger baggage is transported separately from passengers and may travel by a different mode of transport.

In accordance with one or more embodiments of this invention, when a passenger makes a reservation to travel, a passenger identifier number, which may be a ticket or reservation number, is issued and placed in a data collection, which may reside in a database in a computer, together with the passenger's transport number, date of travel, time of travel and method of carrier compensation. When the passenger purchases a ticket to a destination, the ticket comprises information concerning the passenger identifier, the transport number and date of departure. If the passenger is traveling by other means than a purchased ticket, such as a pass, travel award or government travel request, the passenger identifier can serve as a means of uniquely identifying the passenger in place of a ticket.

Rather than check baggage for carriage at the transport check-in counter, under one embodiment of this invention, baggage is checked for carriage to a destination before departure at a baggage collection facility that is separate from the departure and arrival facility. In one embodiment of this invention, the departure and arrival facility is an airport, although the system is equally applicable to other modes of passenger travel, comprising trains, buses and ships. Many baggage collection facilities might be operated in various locations throughout a city, as well as in rural areas, either cooperatively by the carriers or by an independent commercial concern. In the proposed system, passengers will obtain their passenger identifier or ticket at any time in advance of travel and deposit their baggage at a convenient baggage collection center, which may feature drive-in service. The baggage collection center will then accept the baggage for transport to the passengers' ultimate destinations, not merely to the destination transport arrival facilities, which may be airports.

On arrival, passengers will be able to have their baggage delivered directly to their homes, hotels, offices or other locations without having to struggle with the baggage at transport arrival facility baggage pickup carousels. Passengers will not have to carry baggage to their cars or to buses in order to bring the baggage to their homes, hotels or offices. Thus, passengers will be able to enter and leave transport arrival facilities quickly. Passengers changing transport at hubs will be able to transfer to connecting carriers quickly, unencumbered by baggage.

BRIEF DESCRIPTION OF THE DRAWINGS

FIG. 4 comprises an illustration of the second page or screen displayed in an embodiment of the baggage transport system data collection and illustrates the way that baggage is traced at every step during the movement of the baggage through the baggage transport system.

DETAILED DESCRIPTION OF THE INVENTION

A method and apparatus for transporting passenger baggage is described. In one embodiment of the method and system, passengers deposit their baggage at convenient baggage collection centers located away from departure facilities. The passenger baggage is transported separately from passengers to their destinations. After the passengers arrive at their destination arrival facility, their baggage is delivered to them at an address provided by the passenger, thereby avoiding the need for passengers to haul their own baggage from their arrival areas. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. It will be understood, however, that many of the specific details of the passenger baggage transport system and method illustrated in the drawings could be changed, modified or even eliminated in some cases without departing significantly from the spirit of the invention.

In the present invention, the baggage transport system is a combination of an information management subsystem and a transaction management subsystem. In accordance with one or more embodiments of this invention, when a passenger makes a reservation to travel, a passenger identifier number, which may be a ticket or reservation number, is issued and placed in a data collection, which may reside in a database in a computer, together with the passenger's transport number, date of travel, time of travel and method of carrier compensation. When the passenger purchases a ticket to a destination, the ticket comprises information concerning the passenger identifier, the transport number and date of departure. If the passenger is traveling by other means than a purchased ticket, such as a pass, travel award or government travel request, the passenger identifier can serve as a means of uniquely identifying the passenger in place of a ticket.

Rather than check baggage for carriage at the transport check-in counter, under one embodiment of this invention, baggage is checked for carriage to a destination before departure at a baggage collection facility that is separate from the departure and arrival facility. In one embodiment of this invention, the departure and arrival facility is an airport, although the system is equally applicable to other modes of travel, comprising trains, buses and ships. Many baggage collection facilities might be operated in various locations throughout a city, as well as in rural areas, either cooperatively by the carriers or by an independent commercial concern. In the proposed system, passengers will obtain their ticket or passenger identifier at any time in advance of travel and deposit their baggage at a convenient baggage collection center that may feature drive-in service. The baggage collection center will then accept the baggage for transport to the passengers' ultimate destinations, not merely to the destination arrival facilities, which may be airports. Passengers will be able to have their baggage delivered directly to their homes, hotels, offices or other locations, rather than having to struggle with baggage at transport arrival facility baggage pickup carousels. Passengers will not have to carry baggage to their cars or to buses and eventually bring the baggage to their homes, hotels or offices. Thus, passengers will be able to enter and leave transport arrival facilities quickly. Passengers changing transport will be able to transfer to connecting carriers quickly, unencumbered by baggage.

In one embodiment of the invention, the method for handling passenger baggage comprises obtaining a passenger identifier for a passenger, associated with a ticket, to a destination. The method further comprises obtaining passenger baggage for carriage to the destination in at least one passenger baggage collection facility before the passenger's departure, where the passenger baggage is identified by the passenger identifier. The method further comprises obtaining an address at the destination to which the passenger baggage is to be delivered and delivering the passenger baggage to the destination address after the passenger has departed.

Figure 1:
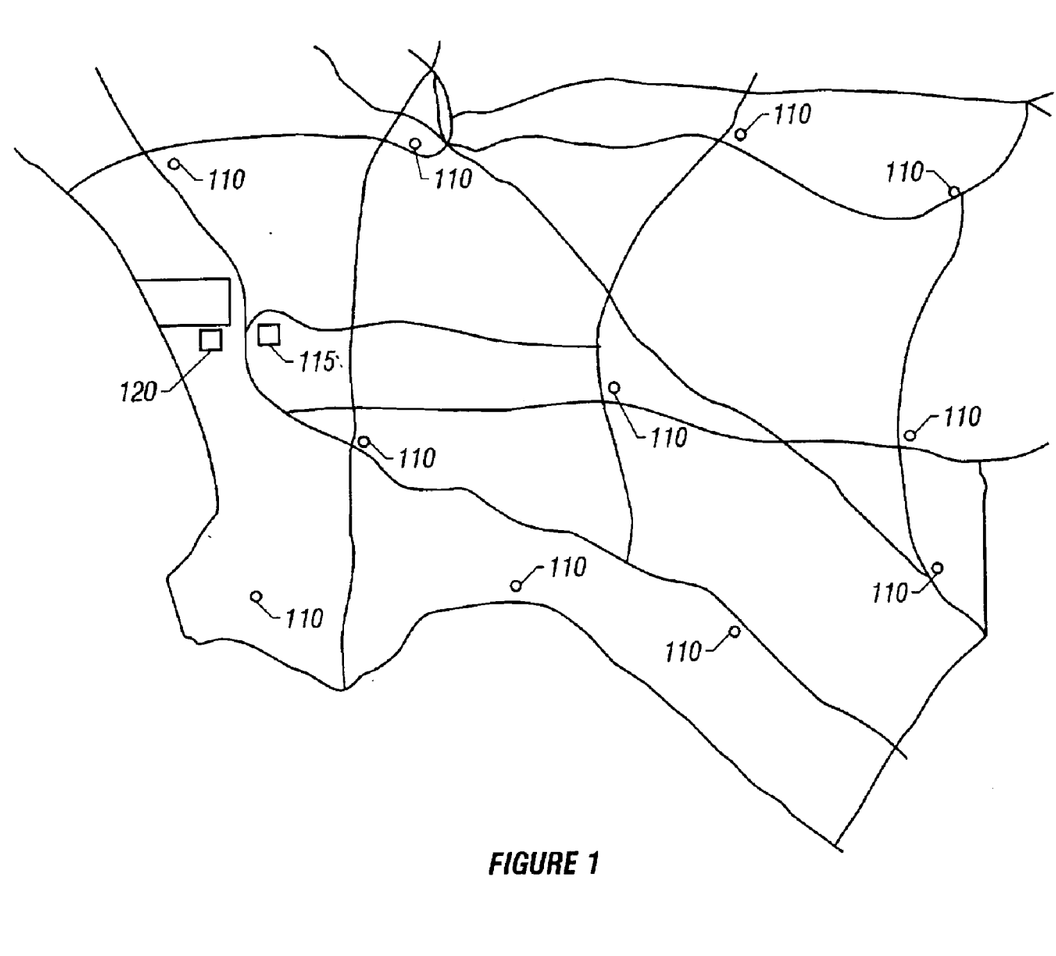
FIG. 1 comprises a map of a typical metropolitan area showing the baggage collection and distribution system and the relationship between the baggage collection center, baggage consolidation center, departure point, arrival point and baggage distribution center.
Figure 2A:
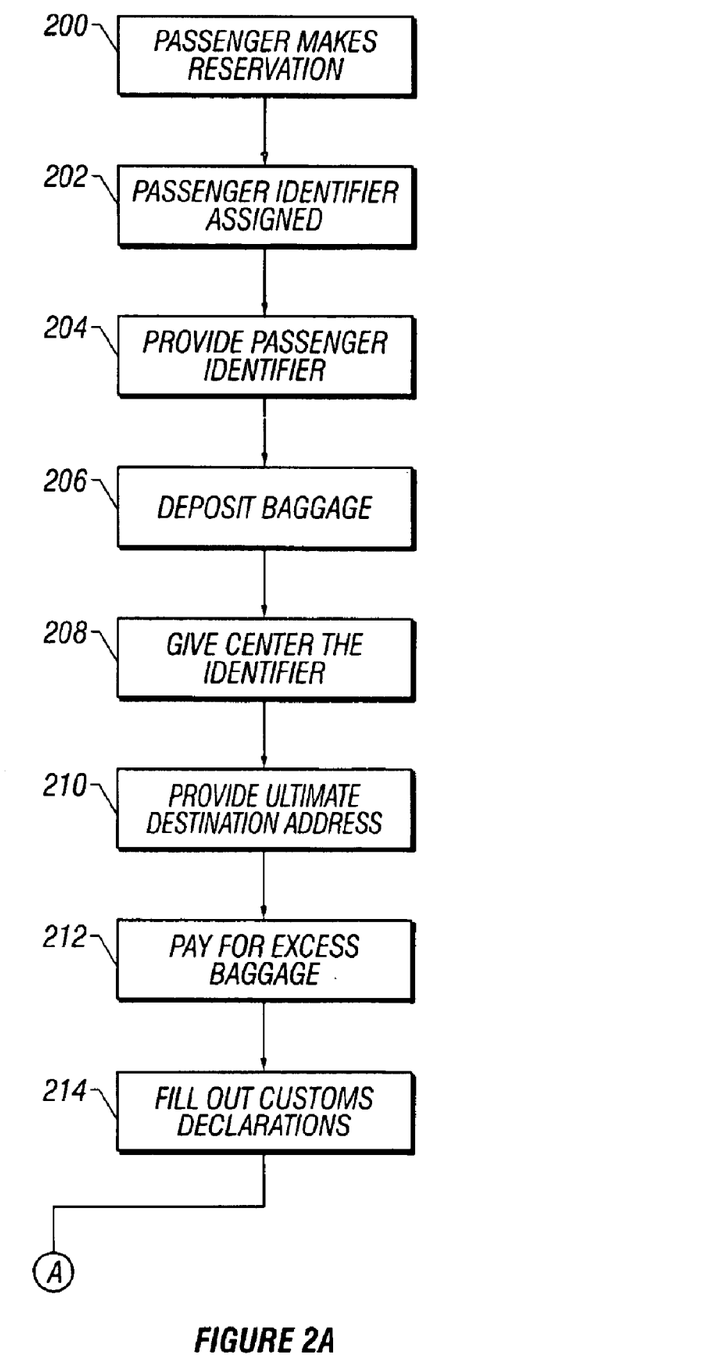
FIG. 2 comprises a flow diagram illustrating an embodiment of the baggage transport system.
Figure 2B:
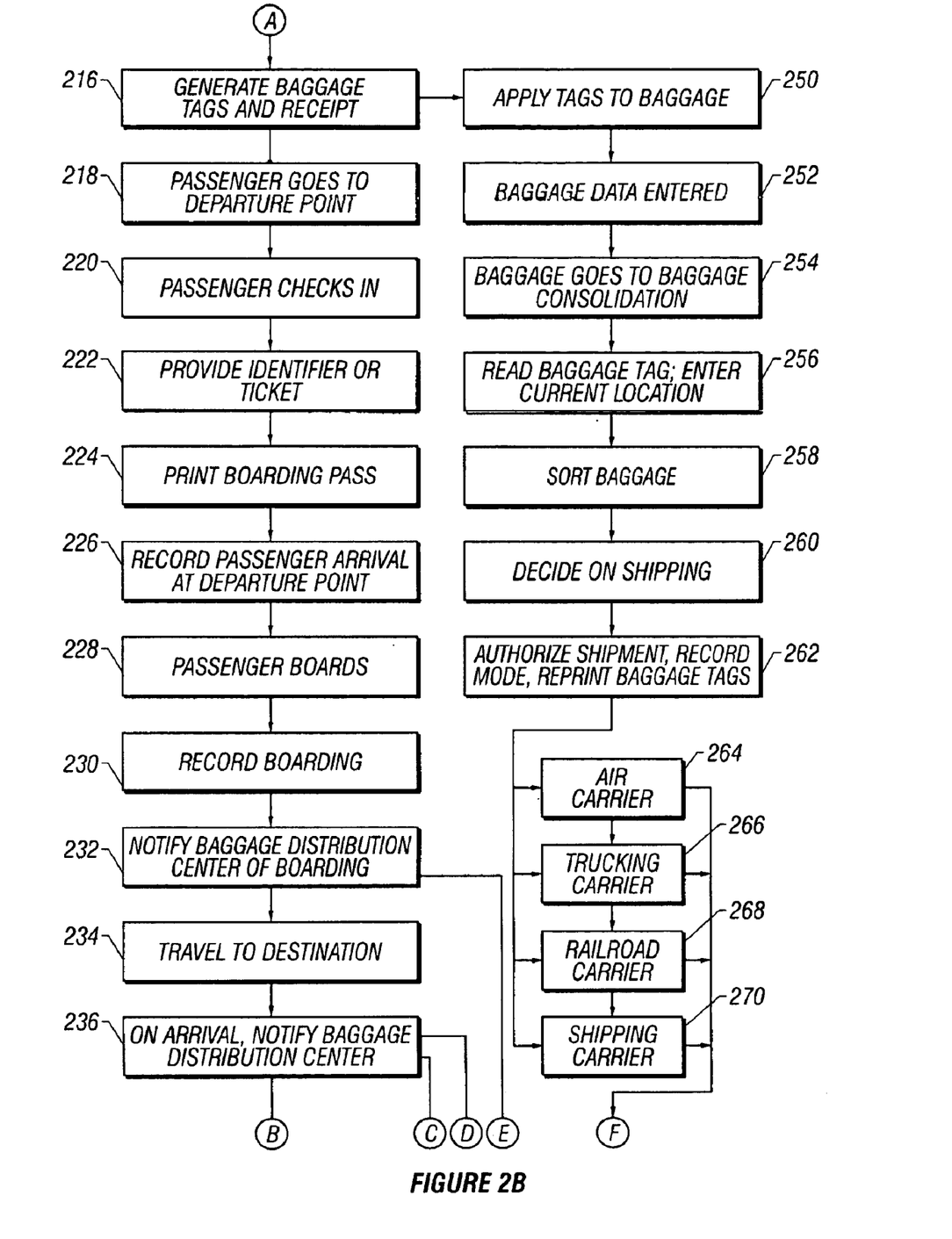
Figure 2C:
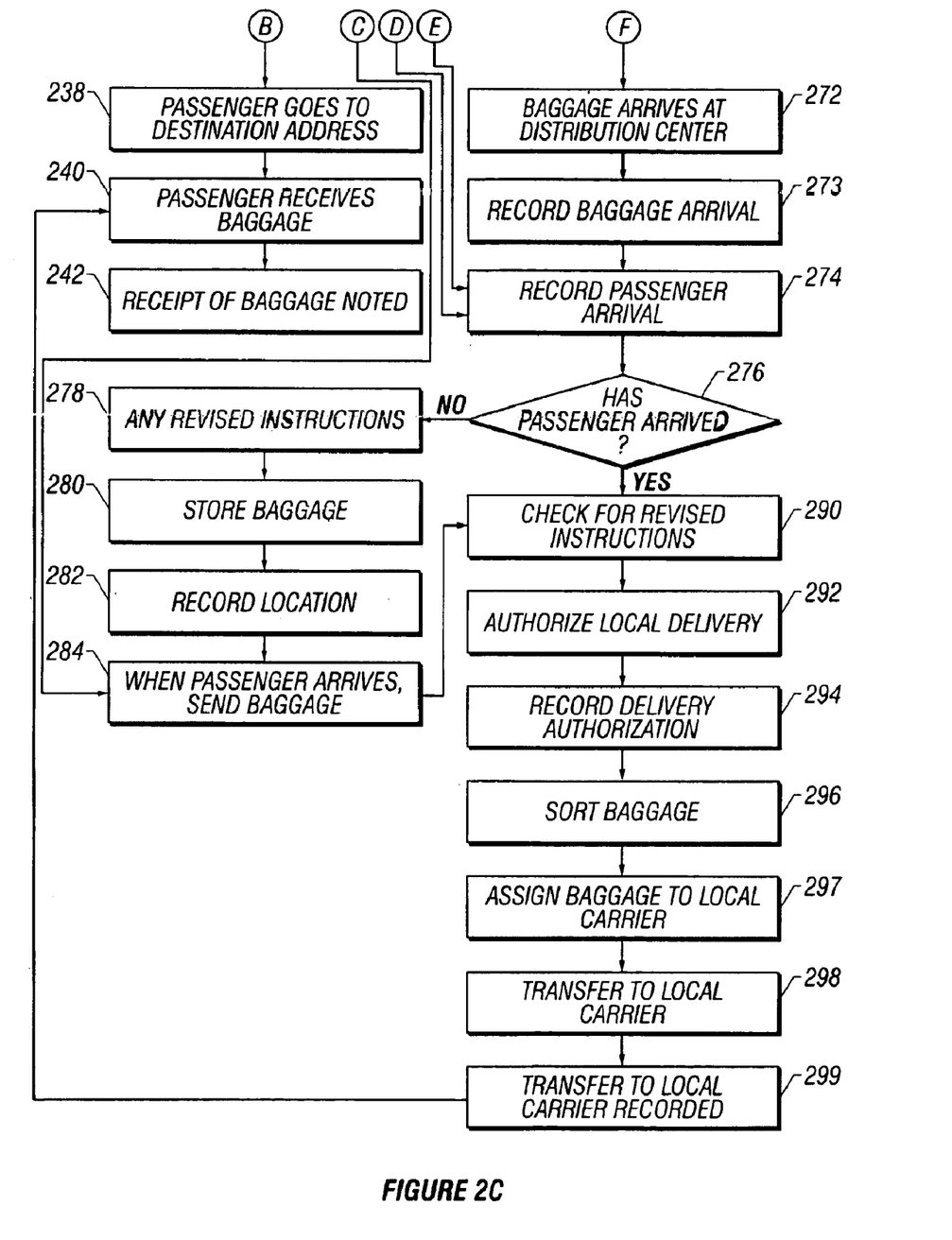
Figure 3:
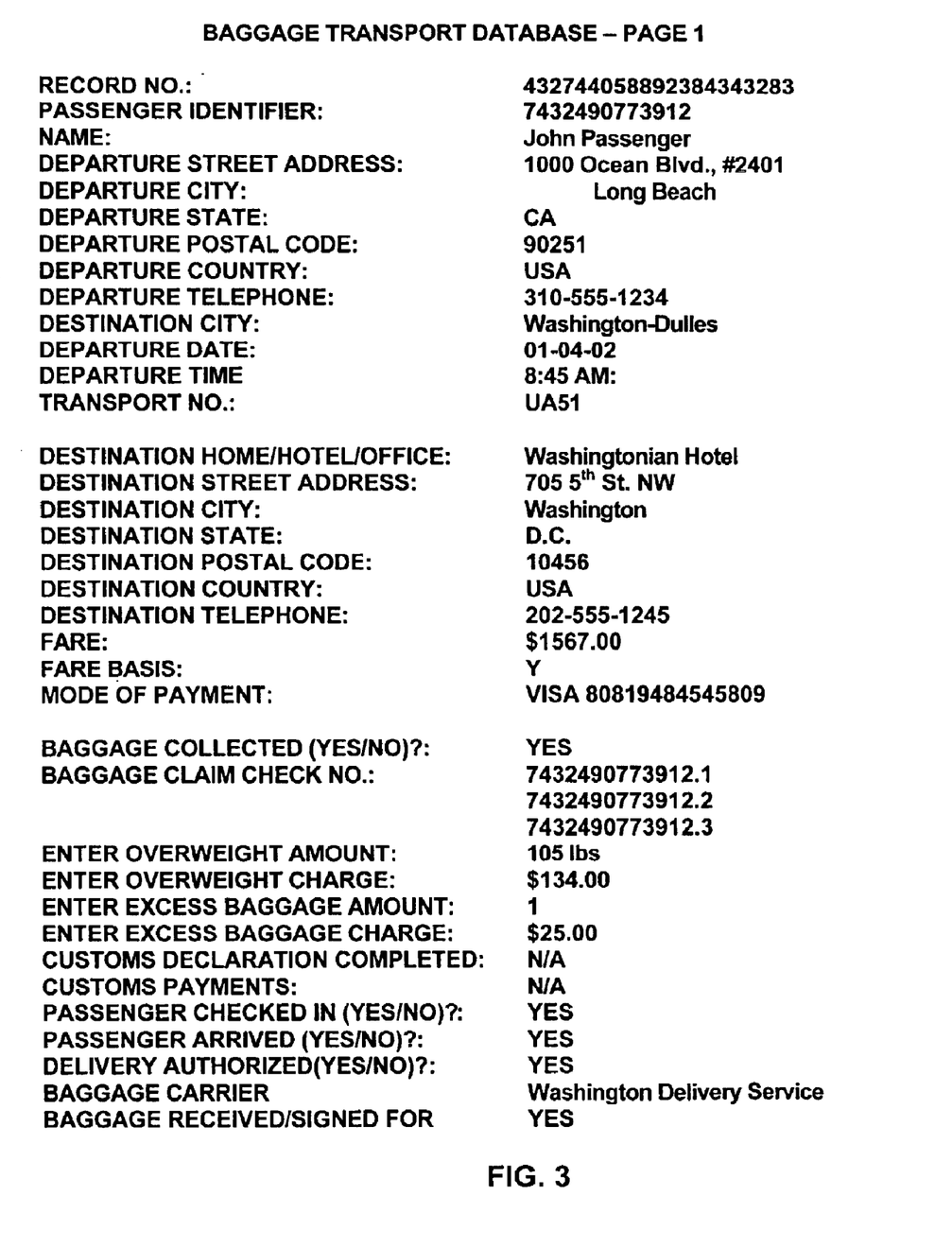
FIG. 3 comprises an illustration of the first page or screen displayed in an embodiment of the baggage transport system data collection, which may be a computer database. The Figure shows baggage identification and delivery information.
Figure 5:
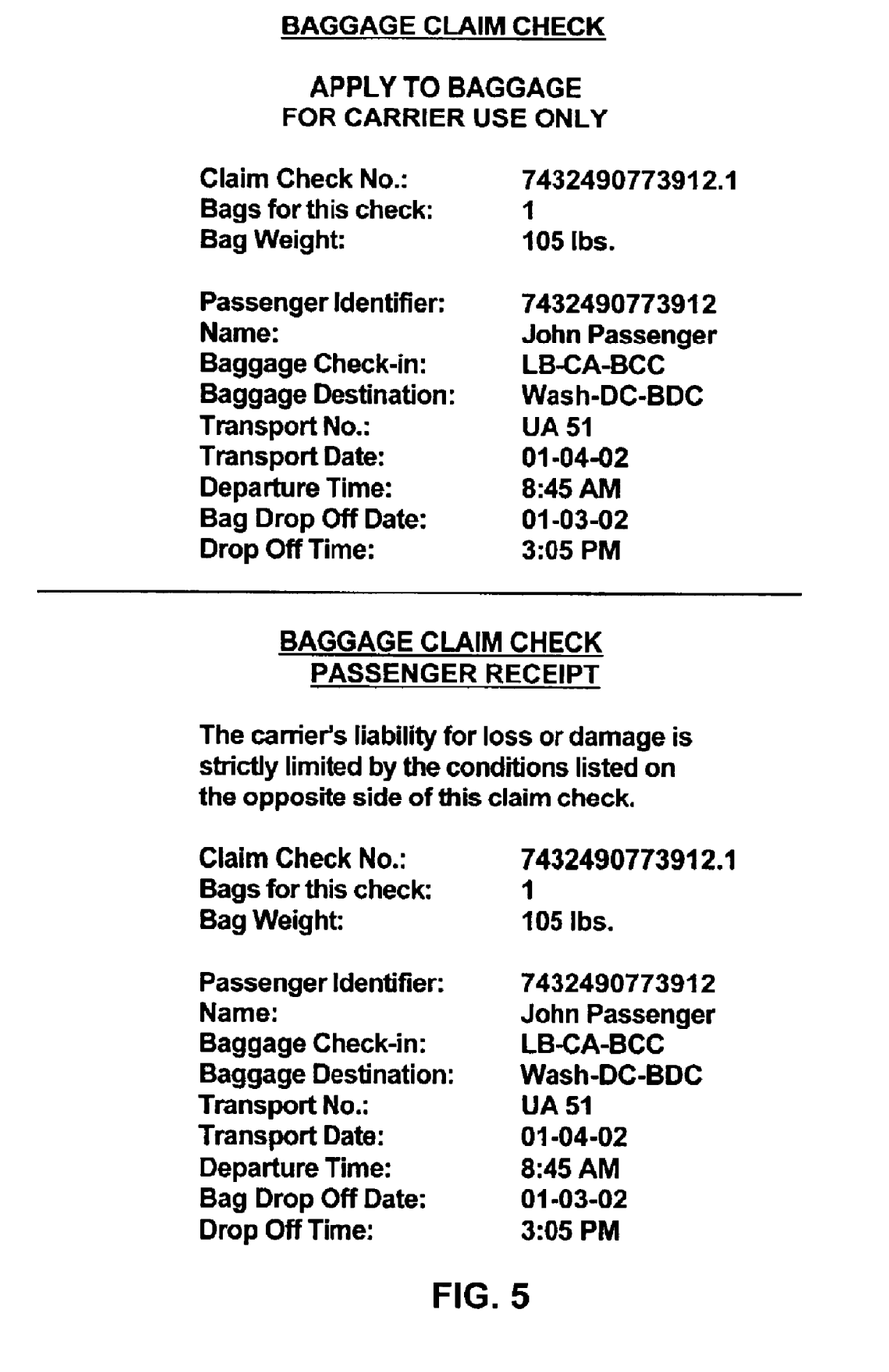
FIG. 5 comprises an illustration of a two part baggage claim check used in one embodiment of the baggage transport system for tracking and delivery. The top portion of the claim check is applied to baggage in the baggage transport system for tracking and delivery and the bottom portion is a receipt given to passengers to be surrendered upon delivery of the baggage.

FIGS. 1–5 comprise illustrations of one embodiment of the invention. FIG. 1 comprises a map of a typical metropolitan area showing the baggage collection and distribution system and the relationship between the baggage collection center, baggage consolidation center, departure facility, arrival facility and baggage distribution center. In FIG. 2, a flow diagram illustrates an embodiment of the baggage transport system. The first page or screen displayed in an embodiment of the baggage transport system data collection is shown in FIG. 3 and provides baggage identification and delivery information. FIG. 4 comprises an illustration of the second page or screen displayed in an embodiment of the baggage transport system data collection and shows the way that baggage is traced at every step of the transport of the baggage through the baggage transport system. The two part baggage claim check used in the baggage transport system for tracking and delivery is shown in FIG. 5. The top portion of the claim check is applied to baggage in the baggage transport system for tracking and delivery and the bottom portion is a receipt given to passengers to be surrendered upon delivery of the baggage.

As noted above, FIG. 1 comprises an illustration of the operation of the baggage transportation system functions as indicated by a map of a metropolitan area showing the relationship between the baggage collection center, the baggage consolidation center, the departure facility, the arrival facility and the baggage distribution center. A passenger will initially request a reservation for travel and obtain a passenger identifier that identifies a data collection entry concerning the travel. The data collection, which may be a computer database, comprises such information as date of travel, destination city and destination address for baggage delivery. Passengers paying for tickets may do so at the time of the reservation or at a later time using the passenger identifier or passenger's name and travel information. Some people will be using passes, prepaid tickets, government travel orders, frequent travel awards or other methods of compensating the carrier for transportation.

In the simplified map of a city shown in FIG. 1, the passenger, after making a reservation for travel to a destination by a preferred mode of travel, deposits his or her baggage at a baggage collection center. In the simplified map, the lines indicate freeways traversing a city on a body of water with the coastline indicated by the line at the bottom of the Figure. The baggage collection center may offer amenities comprising curbside baggage collection for passengers embarking upon domestic travel. At the baggage collection center, the passenger will provide the center with his passenger identifier or ticket, if any. Depending on the size of the city, there will be a number of baggage collection centers, identified by 110 in FIG. 1. Large numbers of baggage collection centers may be placed throughout a metropolitan area as well as throughout rural areas for the convenience of passengers to enable them to deposit their baggage at locations near their homes, hotels or offices. For those passengers who prefer to leave their baggage near the departure facility, a baggage collection center will be provided near, but not in, the transportation departure area of the departure facility. The baggage collection centers are located outside of and relatively remote from the transportation departure facility for the express purpose of reducing the congestion there and to move such functions as security, baggage searches, x-raying of baggage and customs inspections out of the transportation departure facility.

The baggage collection centers may be operated by individual transportation carriers or collectively by a group of transportation carriers to reduce cost. At some time after depositing the baggage at the baggage collection center, the passenger will proceed to the departure facility 100. After check-in, which may include a security check, the passenger will be transported to his destination. Passenger baggage will be transported to a baggage consolidation center 115, where baggage may be consolidated from the various baggage collection centers 110 prior to sorting for shipment to the passenger's destination.

In addition to showing departure facilities, FIG. 1 also is representative of the type of facilities provided at the passengers' destinations. Passengers arriving the arrival facility, also designated by 100, will proceed directly to their homes or hotels after disembarkation from their transport. It is anticipated that, in most cities, facility 100 will comprise both the departure and arrival facility. Arriving passengers' baggage will be transported to a regional baggage distribution center 120 where the baggage will be sorted and assigned to carriers for local transportation to the passengers' homes, hotels or offices.

In FIG. 2, a flow diagram of an embodiment of the baggage transport system processing is illustrated for this invention. Initially, a passenger makes a travel reservation 200 comprising travel on a specific date, at a specific time, from a departure point to a destination by means of a carrier comprising airlines, buses, trains and ships. Information on the ultimate destination address (a home, hotel or office) is also provided if known. Before completing the reservation, the passenger is assigned a passenger identifier 202 that can be used to locate the passenger's reservation, both in ticketing and in baggage handling. The reservation also comprises information needed to contact the passenger, if needed, to advise the passenger of delays and schedule changes. Additionally, the reservation comprises information on the compensation for carriage. Compensation comprises purchased tickets, that may require advance purchase requirements, carrier passes, purchased passes, prepaid tickets, government travel orders and frequent traveler awards. If the compensation requires a ticket purchase, the passenger provides the passenger identifier or the passenger's name, destination, travel date and departure time and then purchases the ticket at step 204 by telephone, through a travel agent or at a baggage collection center.

Prior to departure, the passenger visits a convenient baggage collection center 110 and deposits his baggage at step 206. The baggage collection center can provide curbside baggage checking if desired. As part of the baggage checking procedure at the baggage collection center, the passenger provides the passenger identifier or ticket or name, destination, travel date and departure time at step 208. The passenger also provides at 210 updates on his ultimate destination address for baggage delivery, if known, at the baggage collection center. The passenger has the option of providing this information at the destination also if necessary. At step 212, the passenger pays fees comprising overweight charges and excess baggage charges, over and above established limits. Next, if international travel is contemplated, the passenger fills out papers comprising entrance declarations and customs declarations for his baggage at step 214 and provides other information, comprising passport and visa information. Also, at step 214, other charges, comprising customs fees and landing fees and taxes, are paid to the extent that they are ascertainable.

At step 216, the baggage collection center generates baggage tags and a claim check for the passenger comprising the passenger's passenger identifier, name, destination, time and date of travel and destination delivery address for the baggage. Each item of baggage also carries a baggage checking identifier, associated with the passenger identifier, to uniquely identify each separate piece of checked baggage. After this step, the passenger and the baggage go off to their destination in different ways. At step 250, the baggage collection center applies the baggage tag to each item of baggage and information on the baggage enters the data collection at step 252, where the information is associated with the passenger identifier. The information entered into the data collection comprises the number of items of baggage, the baggage checking identifier for each piece of baggage and unusual baggage characteristics such as size, weight, shape and fragility. Other information entered comprises the destination, passenger transport number, passenger departure time and date, current date and time, and the current baggage location for tracing purposes.

At step 254, the baggage is transported to a baggage consolidation center 115 where the baggage tags are scanned or read and their new location and the current date and time are entered into the data collection at step 256. Baggage is sorted by destination at step 258 and a decision on the mode of shipment is made at step 260. The baggage may be transported to the baggage distribution center in the destination city by air cargo carrier, truck, train, ship, bus or other means. At step 262, shipment of the baggage by a mode of transport is authorized and the baggage tags are supplemented with the new information on the selected carrier and the mode of transport. This information, together with the current date and time, are entered into the data collection. The baggage is sent to the selected carrier at step 263, where the carrier comprises an air cargo carrier 264, trucking carrier 266, railroad carrier 268 and ship carrier 270.

At step 272, the baggage arrives at the destination baggage distribution center 120, where the baggage arrival location, current date and current time are entered into the data collection at step 273. At step 274, the data collection records passenger arrival data, if any. At step 276, the system checks to see if the passenger has arrived. If the passenger has arrived, the data collection is searched for revised delivery instructions at step 290. The baggage tag is supplemented with any revised instructions for delivery. Local delivery of the baggage at the destination is then authorized at step 292 and information concerning the delivery authorization, current date and current time are entered into the data collection at step 294. At step 296, baggage may be sorted according to final local destination and assigned to a local carrier at step 297 for delivery to the passenger's final local destination. At step 298, the baggage is transferred to a local carrier for delivery to the final destination address and this transfer is noted in the data collection at step 299 along with the current date and time. At step 240, the passenger receives the baggage and at step 242 an entry is made in the data collection denoting delivery.

If the passenger has not arrived at step 276, then the system queries the data collection at step 278 for revised instructions. The bags are then sent to storage at step 280 and their location, current date and current time are noted in the data collection at step 282. At step 284, when information about passenger arrival is received from step 236, the baggage is removed from storage and moved to the delivery area. Information about bag removal from storage is recorded in the data collection and a search is again made for revised delivery instructions at step 290. The delivery instructions are then supplemented with any new information. If there are revised instructions, local delivery of the baggage at the destination in accord with the new or existing instructions is authorized at step 292 and information concerning the delivery authorization, current date and current time are entered into the data collection at step 294. At step 296, baggage may be sorted according to final local destination and is assigned to a local carrier at step 297 for delivery to the final local destination. At step 298, the baggage is transferred to a local carrier for delivery to the final destination address and this transfer is noted in the data collection at step 299 along with the current date and time. At step 240, the passenger receives the baggage and at step 242 an entry is made in the data collection denoting delivery.

During the time when the baggage has been processed and transported, the passenger traveled from the baggage collection center to the departure point at step 218. At step 220, the passenger checks in at the departure point. At step 222, the passenger provides the passenger identifier, his ticket if any, or his name, destination, departure time and departure date during check-in. At step 224, a boarding pass and seat assignment are printed for the passenger if seats are assigned. At step 226, the passenger's arrival for check-in is recorded in the data collection. The passenger boards the transport at step 228 and his boarding is recorded at step 230. At step 232, the Baggage Distribution Center is notified that the passenger has boarded the transport. The passenger travels to the destination at step 234 and at step 236, the Baggage Distribution Center is notified of his arrival so that the passenger's baggage can be released for delivery. At step 238, the passenger travels locally to his final destination and receives his baggage at step 240. Final delivery of the baggage is noted at step 242. Should customs require additional payment or have unresolved questions about the baggage of international passengers, the passenger will be notified of the need for payment or of the need to resolve customs issues, either upon disembarkation from the transport or at his destination address.

FIGS. 3 and 4 comprise an illustration of the organization of the data collection that tracks the movements of each passenger's baggage. FIG. 3 illustrates the first page or screen displayed in an embodiment of the baggage transport system data collection and shows baggage identification and delivery information. FIG. 4 illustrates the second page or screen displayed in an embodiment of the baggage transport system data collection and shows the way that baggage is traced at every step of baggage travel through the system. The first screen of the baggage transport data collection, shown in FIG. 3, comprises a number of entries. The first set of entries comprise a record number in the system, the passenger identifier (denoted as 432744058892384343283 in column 2 of FIG. 3), passenger name (John Passenger), and departure information comprising the departure street address (1000 Ocean Blvd.), city (Long Beach), state (Calif.), postal code (90251), country (USA) and passenger telephone number (310-555-1234). Next, the screen displays additional travel information, comprising the destination city (Washington-Dulles airport), departure date (Jan. 4, 2002), departure time (8:45 AM) and transport number (UA 51). The next items comprise destination information comprising the destination home, hotel or office (referred to as the Washingtonian), street address (705 5$^{th}$ St. NW), city (Washington), state (D.C.), postal code (10456), country (USA) and passenger telephone number (202-555-1245). Additional items displayed comprise the fare ($1567.00), fare basis or type of fare (Y), and mode of payment (VISA 80081948445809). Next, the screen shows data comprising whether the baggage was collected (YES), the baggage claim check numbers (7432490773912.1, 7432490773912.2, 7432490773912.3), related to the passenger identifier, overweight amount (105 pounds), overweight charge ($134.00), excess baggage amount (1 bag), excess baggage charge ($25.00), customs declaration (N/A), and customs payments (N/A). Finally, the screen displays information concerning passenger departure check-in (YES), passenger destination arrival (YES), baggage delivery authorization (YES) and the baggage carrier that will deliver the baggage to the ultimate destination (Washington Delivery Service). The last entry indicates whether the passenger has signed for the baggage at the passenger's final destination (YES).

FIG. 4 comprises an illustration of the second screen or page of the data collection entry for the traveler of FIG. 3. The Baggage Trace Data comprises the baggage claim check number, location of the baggage, and the date and time the information was entered into the data collection. Letters and numbers following dash after the facility name indicate the bin or container number where the baggage can be found within these large buildings. The transport of the baggage can be followed at each step of baggage transport to facilitate tracing of lost baggage and to provide the passenger with the status of the baggage. As an example, the Screen of FIG. 4 also comprises information on the date and time the baggage was deposited at the Long Beach Baggage Collection Center (Long Beach BCC in the entry shown in column two of FIG. 4, showing the data screen), arrival of the baggage at the Los Angeles Baggage Consolidation Center (Los Angeles BConC), and the transfer of the baggage to Quick Baggage Transport (Los Angeles Qck Bag Trns) for transport from Los Angeles to Washington overnight. In Washington, the arrival of the baggage at Quick Baggage Transport in Washington (Washington Qck Bag Tms) is shown and the arrival of the baggage at the Washington Baggage Distribution Center (Washington BDC) is noted, with information on the location of the baggage within the Washington Baggage Distribution Center. This entry is followed by information on the passenger, comprising the passenger's check-in for transport in Los Angeles, boarding the transport in Los Angeles and arrival in Washington. Upon the passenger's arrival, the Washington Baggage Distribution Center authorized local delivery and released the baggage (entry showing RELEASED BDC in column two of FIG. 4) to the Washington Delivery Service (Washington Delivery Serv), again noting the date and time. Finally, the data collection comprises a note about the delivery of the baggage at the passenger's hotel (John Passenger Washingtonian) indicating the name of the person signing for the baggage.

FIG. 5 comprises an illustration of the two part baggage claim check used in the baggage transport system for tracking and delivery. The top portion of the claim check is applied to baggage in the baggage transport system for tracking and delivery and the bottom portion is a receipt given to passengers to be surrendered upon delivery of the baggage. The baggage claim check generated at step 216 is shown in FIG. 5 and is applied to each bag. The baggage claim check applied to the baggage comprises a list indicating the claim check number (7432490773912.1), which is related to the passenger identifier, the number of bags per claim check, usually one, and the bag weight (105 pounds in this example). Next, the claim check lists information comprising the passenger identifier (7432490773912), passenger name (John Passenger), departure point for the baggage or initially check-in point (LB-CA-BCC referring to the Long Beach Baggage Collection Center), and destination city baggage distribution center (Wash-DC-BCC, referring to the Washington DC Baggage Distribution Center). Other information listed comprises the passenger transport number (UA 51), passenger date of transport departure(Jan. 4, 2002), departure time (8:45 AM), baggage drop off date at the departure city (Jan. 3, 2002) and drop off time (3:05 PM) in Long Beach, Calif. The bottom portion of the baggage claim check, which constitutes the passenger's receipt for the baggage, also comprises information on the claim check number, which is related to the passenger identifier, the number of bags per claim check, usually one, and the bag weight. Next, the bottom of the claim check lists information comprising the passenger identifier, passenger name, departure point for the baggage or where the passenger initially checked in, destination city baggage distribution center, passenger transport number, passenger date of transport, departure time, baggage drop off date and drop off time.

In an embodiment of the invention, the baggage transport system comprises baggage handling and ticketing and is a combination of an information management subsystem and a transaction management subsystem. These two subsystems interface with each other and also interface with other operating systems, comprising schedule and ticketing systems and other shipping related systems. Both the information management subsystem and the transaction management subsystem are designed to use a client/server architecture. The server computer is managed and operated by the carrier. The client computers are remotely located and distributed throughout the country and internationally. The client computer and the server computer are connected through available communication links, comprising the Internet, land line and wireless systems. Communication between the client computer and the server computer is secured by the use of state of the art encryption protocols.

In one embodiment of this invention, a passenger can have access to the information management subsystem with a personnel computer that functions as a client computer in the client/server system. As the information management subsystem interfaces with the carrier schedule and ticketing systems, the passenger, through the client computer, by connecting to the server computer, can purchase a ticket electronically. Prior to the purchase of the carrier ticket, a passenger registers with the server computer by providing certain personal information including a confidential password selected by the passenger. For future access to the server data collection, the passenger has to use the password for authentication. The passenger can also print a copy of the ticket through a standard printer connected to the client computer. The payment for the purchase of the ticket comprises the use of credit, debit or smart cards. Furthermore, the system allows the passenger to select seating and obtain a seating assignment in the transport. Through this system, a valid boarding document can be downloaded to the client computer and be printed on a standard printer.

Next, the server computer prepares a travel record for the passenger and stores the travel record in the data collection accessible to the passenger at any time with proper authentication. Passenger authentication in this embodiment comprises passenger password verification. Many other methods of authentication might be employed.

Authorized carrier personnel have access to the passenger travel record through the use of client computers with a communication links to the server computer. Various security measures are implemented in the system to achieve traceability for the purpose of identifying persons with access to the system. Furthermore, the system captures and records the identity of any person reviewing or changing a record.

Once a passenger completes the ticket purchase transaction, the server computer prepares the copy of the ticket that can be printed by a standard printer connected to a client computer by the passenger. This printed ticket copy is primarily for the purpose of record keeping for the passenger. However, the boarding document that is prepared by the server computer and printed with the use of a standard printer connected to a client computer by the passenger is a valid document for boarding the transport. Another form of identification that contains a photograph of the passenger may be necessary. Acceptable identification comprises a valid driver's license issued by a State or a valid passport issued by a Country along with the boarding document to board the transport. The availability of a pre-printed valid boarding document to a passenger makes the boarding process at the departure gate more efficient and cost effective for the carrier.

In this embodiment, the boarding document, prepared by the server computer, comprises, in readable text, pertinent information regarding the transport segments, including passenger identification, transport number, date of travel, departure time, and destination. The boarding document also contains seating assignments for the various carrier segments and barcodes that contain the pertinent transport information of the passenger including a digital identification of the passenger. For example, if there were three transport segments from the place of departure to the final destination, there would be three barcodes identifying each of the transport segments. Single dimension and two-dimensional barcodes could be used on the boarding document. Two-dimensional barcodes can contain more information for similar size compared to the single dimensional barcode.

At the time of passenger boarding, the barcode on the boarding document is scanned with the use of a hand held scanner to record the boarding of the passenger. The scanner is connected to the server computer data collection through any of the available communication links, comprising the Internet, virtual private networks and wireless systems. Through scanning, the barcode information is compared with the passenger travel record stored in the server computer database. This process validates the authenticity of the boarding document. After scanning, the passenger travel record in the database is updated to reflect the boarding of the aircraft by the passenger.

The passenger does not bring any accompanying baggage, other than one piece of hand carried baggage, to the airport. Instead, the passenger takes the accompanying baggage to any one of the nearby baggage collection centers distributed throughout the region on the day of travel or the day prior to the travel departure date. These baggage collection centers are created by utilizing-various airline carrier offices distributed throughout the region or by agreements between the carriers and various shipping and mailing outlet centers distributed throughout the country. The baggage collection centers function as agents of the carrier for shipping the baggage accompanying the passengers.

In this embodiment, the passenger purchased a ticket prior to bringing the baggage to the collection center. The baggage collection centers are equipped with client computers and can be connected to the server computer through a number of communication links. Each of the baggage collection centers can be individually authenticated and communication between client computers in the baggage collection centers and the server is totally secure. By accessing the information management subsystem, the client computer at the baggage collection center can verify passenger travel information. If the passenger travel record in the information management subsystem shows that the passenger has not printed a valid boarding document, then a boarding document is printed at the baggage collection center, through a standard printer connected to the client computer, for the passenger. The system records the printing of the boarding document for the passenger at the baggage collection center and updates the passenger travel record. This procedure facilitates tracing access to passenger travel records if needed.

The passenger provides a destination address to which the baggage will be delivered within twenty-four hours of the transport departure time, if the final destination is within the country, and within forty-eight hours of departure time if the final destination is outside the country. For international travel, due to customs requirements, the passenger will have to prepare necessary customs declarations before travel and appropriate digital forms will be included in the passenger's travel record. Generally, the cost of baggage handling and shipping will be included in the purchase price of the ticket. In the event of excess baggage, additional charges will be paid through the use of a credit, debit or smart card. Customs charges, including any customs processing expenses, can be prepaid as well.

Once baggage is collected at the baggage collection center, the shipping of the baggage to the destination is processed through the use of the transaction management subsystem. The transaction management subsystem is designed to develop an optimal shipping plan for transporting the baggage from the shipping location to the destination address. The transportation of the baggage will involve the use of ground carriers for transporting the baggage from the baggage collection center to the appropriate nearby transport departure area. Baggage transport may involve the use of air carriers for air transportation of the baggage to the passenger destination and ground carriers for transporting the baggage from the destination arrival point to the final destination address.

Security considerations suggest that the baggage should be shipped through cargo carriers. The scheduling of the various transportation carriers is performed by the transaction management subsystem and utilizes an optimal logistics algorithm to improve efficiency. This can be accomplished through agreements between passenger and cargo carriers. Land transportation of baggage is provided by local ground carriers through agreements between the passenger carriers and the local ground carriers. The former baggage space in the passenger transport may be primarily filled by commercial cargo that has undergone a security check. As there will be no time constraint due to concern about transport delays, there will be sufficient time to process the passenger baggage through a comprehensive security check. Moreover, there will be an additional opportunity for increased scrutiny of baggage belonging to certain passengers, based on passenger profiles.

The cost associated with the ground transportation of baggage from the baggage collection center to the departure area and the ground transportation of baggage from the destination point to the final destination address will be an additional cost in this embodiment. However, the cost savings, due to the increase in efficiency and productivity, will more than offset the additional cost.

The transaction management subsystem is designed to have the server computer prepare necessary shipment routing instructions, shipping labels and tags that will be required and transmit them to a client computer located at the baggage collection center. At the baggage collection center, the necessary shipping labels and tags are printed through a standard printer connected to the client computer. Shipping labels and the tags will be attached to the baggage as needed. The server computer also prepares shipment pickup and delivery instructions and related shipping orders that are electronically communicated to the various cargo and passenger carriers, as determined by the optimal logistics algorithm. A copy of these instructions and orders is made part of the passenger travel record.

For increased efficiency, the baggage brought to the baggage collection center may be accumulated for transport. The baggage collection center will prepare and transmit pickup and delivery orders for each item of baggage to land carriers who will transport the baggage at specific predetermined times on every day. For example, baggage might be transported from the baggage collection center at 12:00 noon and 4:00 pm every day.

When the passenger brings the baggage to the baggage collection center, the passenger will receive a receipt with a baggage identification number, associated with the passenger identifier that can be used for tracking after the baggage is processed for shipment. The receipt is prepared by the server computer and printed at the baggage collection center through a standard printer connected to the client computer. In the event the baggage is not properly delivered, the baggage identification number on the receipt can be used to track and locate the baggage for delivery at the destination address. The transaction management subsystem interfaces with the shipment tracking system used by the various transportation carriers and updates the status of the shipment of the baggage. The status of the baggage is updated in the passenger travel record also by the interface between the transaction management subsystem and the information management subsystem.

In this invention, a novel system has been developed to increase the security and convenience of passengers and to increase security, productivity, and efficiency of the carriers by streamlining and substantially changing the baggage handling system that is currently used. The invention reduces the congestion at departure areas by not using any space at the passenger terminals for the baggage handling functions that are accomplished at a distributed network of baggage collection centers equipped with the client computers where the passengers deposit their baggage prior to their travel, instead of the departure area. The invention provides that the accompanying baggage will be directly delivered to the destination address provided by the passenger.

The invention enables a passenger, with the help of a client computer, to connect online to the server computer maintained by the carrier for the purchase and printing of an electronic ticket and a valid boarding document. The invention enables the passenger, with the help of a client computer after proper authentication, to have access to the passenger travel record stored on the server computer's database that contains the delivery status of the passenger's baggage. In conclusion, a method and apparatus for transporting baggage separately from passengers is described with one or more specific embodiments. The invention is defined by the claims and the full scope of equivalents.

What is claimed is:

1. A method for handling passenger baggage, comprising:
    obtaining a passenger identifier for a passenger associated with a ticket to a destination arrival facility;
    obtaining passenger baggage for carriage to said destination in at least one passenger baggage collection facility before said passenger's departure, said passenger baggage identified by said passenger identifier;
    obtaining a destination address at said destination to which said passenger baggage is to be delivered;
    determining a mode of shipment from a plurality of available modes; and
    delivering said passenger baggage to said destination address after said passenger has departed.

2. The method of claim 1, wherein said at least one passenger baggage collection facility is located separately from a transport departure facility.

3. The method of claim 1, wherein said baggage destination address is at an address different from said destination arrival facility.

4. The method of claim 1, wherein said at least one passenger baggage collection facility is located at an entrance to a transport departure facility.

5. The method of claim 1, wherein said passenger baggage is transported by truck.

6. The method of claim 1, wherein said passenger baggage is transported by train.

7. The method of claim 1, wherein said passenger baggage is transported by ship.

8. The method of claim 1, wherein said passenger baggage is transported by air carrier.

9. The method of claim 1, wherein overweight passenger baggage payments are collected at said passenger baggage collection facility.

10. The method of claim 1, wherein excess passenger baggage payments are collected at said passenger baggage collection facility.

11. The method of claim 1, wherein customs payments are collected at said passenger baggage collection facility.

12. The method of claim 1, wherein customs documents are obtained at said passenger baggage collection facility.

13. The method of claim 1, wherein said passenger pays passenger baggage transport costs if said passenger fails to complete travel to said destination arrival facility once said passenger's said passenger baggage has been accepted at said passenger baggage collection facility.

14. The method of claim 1, wherein at least one of said passenger identifier, ticket information, and said baggage destination address are stored in a database.

15. The method of claim 1, wherein at least one of said passenger identifier, ticket information, and said baggage delivery address are stored in a database when a travel reservation is made.

16. A system for handling passenger baggage, comprising:
    a ticketing system;
    a baggage collection system, wherein passenger baggage for carriage is collected before departure;

said passenger baggage associated with a ticket to a destination arrival facility and a baggage delivery address at said destination; and a transportation and delivery system for delivery of said passenger baggage to said baggage destination address, said transportation and delivery system comprising means for determining a mode of shipment from a plurality of available modes.

17. The system of claim 16, wherein said baggage collection system comprises at least one passenger baggage collection facility.

18. The system of claim 17, wherein said at least one passenger baggage collection facility is located separately from a transport departure facility.

19. The system of claim 17, wherein said at least one passenger baggage collection facility is located at an entrance to a transport departure facility.

20. The system of claim 16, wherein said baggage destination address is at an address different from said destination arrival facility.

21. The system of claim 16, wherein said passenger baggage is transported by truck.

22. The system of claim 16, wherein said passenger baggage is transported by train.

23. The system of claim 16, wherein said passenger baggage is transported by ship.

24. The system of claim 16, wherein said passenger baggage is transported by air carrier.

25. The system of claim 17, wherein overweight passenger baggage payments are collected at said passenger baggage collection facility.

26. The system of claim 17, wherein excess passenger baggage payments are collected at said passenger baggage collection facility.

27. The system of claim 17 wherein customs payments are collected at said passenger baggage collection facility.

28. The system of claim 17, wherein customs documents are obtained at said passenger baggage collection facility.

29. The system of claim 16, wherein a passenger pays passenger baggage transport costs if said passenger fails to complete travel to said destination arrival facility once said passenger's said passenger baggage has been accepted by said baggage collection system.

30. The system of claim 16, wherein at least ticket information and said baggage destination address are stored in a database.

31. The system of claim 16, wherein at least ticket information, and said baggage delivery address are stored in a database at the time a travel reservation is made.

32. The method of claim 1, wherein said delivering of said passenger baggage comprises transportation of said passenger baggage by one or more carriers.

33. The method of claim 32, wherein said transportation by one or more carriers comprises at least one of:

transportation by truck;

transportation by train;

transportation by ship; and transportation by air carrier.

34. The system of claim 16, wherein said transportation and delivery system comprises one or more transportation carriers.

35. The system of claim 34, wherein said one or more transportation carriers comprises at least one of:

a truck;

a train;

a ship; and an air carrier.

* * * * *